(12) United States Patent
Thériault

(10) Patent No.: US 7,967,124 B2
(45) Date of Patent: Jun. 28, 2011

(54) PACKAGE STREAM INDEXER DEVICE

(76) Inventor: Dominic Thériault, St-Jacques (CA)

( * ) Notice: Subject to any disclaimer, the term of this patent is extended or adjusted under 35 U.S.C. 154(b) by 305 days.

(21) Appl. No.: 12/216,942

(22) Filed: Jul. 14, 2008

(65) Prior Publication Data

US 2010/0006400 A1    Jan. 14, 2010

(51) Int. Cl.
*B65G 13/00*    (2006.01)
(52) U.S. Cl. .................... 193/35 TE; 198/787; 198/817
(58) Field of Classification Search ............. 193/35 TE; 198/787, 817, 860.5, 866, 626.1, 626.2
See application file for complete search history.

(56) References Cited

U.S. PATENT DOCUMENTS

| | | | |
|---|---|---|---|
| 3,610,404 A | | 10/1971 | Fleischauer et al. |
| 3,620,139 A | * | 11/1971 | Kulwicki ...................... 226/171 |
| 4,266,650 A | * | 5/1981 | Patel et al. ................ 193/35 TE |
| 5,147,025 A | * | 9/1992 | Flippo ........................... 198/782 |
| 5,456,348 A | | 10/1995 | Whetsel et al. |
| 5,529,081 A | * | 6/1996 | Kappler ...................... 134/64 R |
| 5,632,371 A | * | 5/1997 | Best et al. ................... 198/781.1 |
| 5,636,728 A | * | 6/1997 | Best et al. ....................... 198/782 |
| 5,924,550 A | * | 7/1999 | Karpinsky ...................... 198/831 |
| 6,186,663 B1 | * | 2/2001 | Ausnit .............................. 383/63 |
| 6,357,705 B1 | * | 3/2002 | Hackett ....................... 248/163.2 |
| 6,397,999 B1 | * | 6/2002 | Taylor ....................... 193/35 TE |
| 6,675,946 B2 | * | 1/2004 | Lutz ........................... 193/35 TE |
| 6,786,326 B2 | * | 9/2004 | Hiramoto et al. ............. 198/817 |
| 6,851,539 B2 | * | 2/2005 | Flippo et al. ............... 193/35 TE |
| 7,090,064 B2 | * | 8/2006 | Lutz ............................. 193/35 R |
| 7,150,352 B2 | | 12/2006 | Cotter et al. |
| 7,441,648 B1 | * | 10/2008 | Kitazumi et al. ............. 198/623 |
| 7,513,356 B2 | * | 4/2009 | Veit et al. ................. 198/370.02 |
| 7,708,134 B2 | * | 5/2010 | Doan ............................ 198/787 |

* cited by examiner

*Primary Examiner* — Douglas A Hess
(74) *Attorney, Agent, or Firm* — Equinox Protection; Franz Bonsang, Patent Agent

(57) ABSTRACT

A package stream indexer device for indexing a stream of packages being displaced thereon within a stream plane includes a first articulated track with live rollers and a second articulated track with depending pressure wheels for maintaining packages in contact with the first track and within the package path defined there between within the stream plane. The first and second articulated tracks are each composed of a plurality of interconnected links frictionally engaged together to allow adjustment in track orientation from one set position to another by means of dynamic movement on the track.

20 Claims, 7 Drawing Sheets

PACKAGE STREAM INDEXER DEVICE

FIELD OF THE INVENTION

The present invention relates to a package stream indexer device for use in a conveyor system deployed for the purpose of conveying a stream of folded cartons or packages within a package handling system.

In particular, the invention has reference to a package stream indexer device for transferring the stream packages from one station conveyor to at least one other station conveyor along a selected path.

BACKGROUND OF THE INVENTION

It is well known in the art to vary the direction of a stream (or shingle) of packages in the form of folded boxes, cartons, letters and the like while substantially keeping that stream in a same plane for further processing of the packages. Such changes of stream direction require the use of either a relatively complex and cumbersome curved belt conveyor having relatively large radius of curvature or a curved live roller conveyor having a series of adjacent tapered rollers to induce turning of the stream, or an amalgam of such conveyors, as exemplified in U.S. Pat. Nos. 3,610,404 and 7,150,352.

Although these curved conveyors suit their needs, they have a fixed direction of curving as well as a fixed curve angle, unless they are made of multiple successive removable sections each of fixed curve angle, which significantly increase the complexity, cost and maintenance of such conveyors. Such transfer mechanisms are generally static in terms of their sitting and accordingly are of limited flexibility when alternative conveying arrays need to be adopted, thus requiring significant rearrangement of system elements.

Accordingly, there is a need for a package stream indexer device which obviates or significantly reduces the highlighted problem.

SUMMARY OF THE INVENTION

It is therefore a general object of the present invention to provide a package stream indexer device which meets the needs outlined above.

An advantage of the present invention is that the device is of relatively simple and yet effective construction which satisfies the arduous tasks to be undertaken in a package stream or shingle handling in a typically 90-degree curved path (or any other angle depending on the length of the indexer device) of relatively small radius within a same stream plane.

Another advantage of the present invention is that the package stream indexer device facilitates the reorientation of a conveying package stream in a versatile and novel manner, such as when the packages within a stream need to be reoriented relative to one another within the stream with a 90-degree rotation when the output stream conveyor of the device is oriented substantially parallel relative to the input stream conveyor, to essentially have an output stream flowing in a same direction as from the input stream.

A still further advantage of the present invention is that the device presents a low maintenance mechanism and is accordingly economic to install and to run.

Accordingly the invention provides a package stream indexer device for indexing a stream of packages being displaced thereon within a stream plane, comprising of a support section mounted on a mounting frame and including a series of live rollers mounted on an articulated track defining a shaped package path having an articulation line substantially within the stream plane, the track being formed of a plurality of interconnected links frictionally engaged together and adapted for dynamic movement for the purpose of altering the orientation of the shaped package path, each said link of the plurality of links pivotally interconnecting to an adjacent said link about aft articulation axis generally perpendicular to the stream plane, and an opposite package retainer mechanism mounted on the mounting frame and being disposed adjacent and in spaced relation to the articulated track in a direction perpendicular to the stream plane for keeping packages in abutment contact with the rollers with the stream plane.

Conveniently, the package retainer mechanism includes a pressure mechanism to ensure the packages remain in abutment contact with the rollers.

Typically, the articulated track is a first articulated track, and the package retainer mechanism includes a series of pressure wheels mounted on a second articulated track formed similarly to the first articulated track, the second articulated track complementing the first track in defining the shaped package path and also being adapted for dynamic movement for the purpose of assuming the orientation of the package path.

Conveniently, the first and second articulated tracks are lower and upper tracks, respectively.

The package stream indexer further consists of a displaceable output conveyor which may form part of a package handling and conveying system.

The package stream indexer is in practice supported in such manner as to enable appropriate alignment between a delivery conveyor and the displaceable output conveyor.

The links of the first and second articulated tracks taken individually are interconnected about an articulation axis generally perpendicular to the stream plane in such manner as to enable the tracks to be dynamically moved either manually or mechanically and to assume and maintain in a set condition the appropriate orientation of the package path in the absence of further activity.

The live rollers of the first track are suitably driven by for example belts reeved around the rollers, conveniently within grooves formed therein, and are rotatably mounted in the links in such a way as to allow the reorientation of the track without being impeded. The live rollers may advantageously be provided with friction bands to assist in use the conveyance of packages in contact therewith. At least one motor is provided to drive the rollers.

Each drive belt may be an elastic drive belt. The grooves are typically located adjacent the articulation line. Preferably, each roller includes a pair of grooves located adjacent to and on a respective side of the articulation line, and each groove of the pair receives a respective drive belt reeved therearound for connection with a respective one of preceding and succeeding adjacent rollers.

The pressure wheels of the second track may be mounted on pivotable arms attached in spaced manner along the length of said second track, the arms being adapted to pivot such as in use to bring the wheels into contact with the packages passing along the first track in order to maintain alignment of the packages on the track.

The links of both the first and second tracks are constructed to be frictionally and pivotally interconnected so as to provide one plane of movement as between each other and in use dynamic displacement of the tracks occasions movement of the links from one set position to another reoriented and set placement. The tracks are suitably supported in the chosen position by brackets or the like which affix to a standing structure, for example the support framework of a conveyor or to rails that are provided on such a framework for this purpose. Both tracks are hinged to allow them to be parked in a non-operational position and also to be moved into an operational position.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

DETAILED DESCRIPTION OF THE PREFERRED EMBODIMENTS

With reference to the annexed drawings the preferred embodiment of the present invention will be herein described for indicative purpose and by no means as of limitation.

Figure 1:
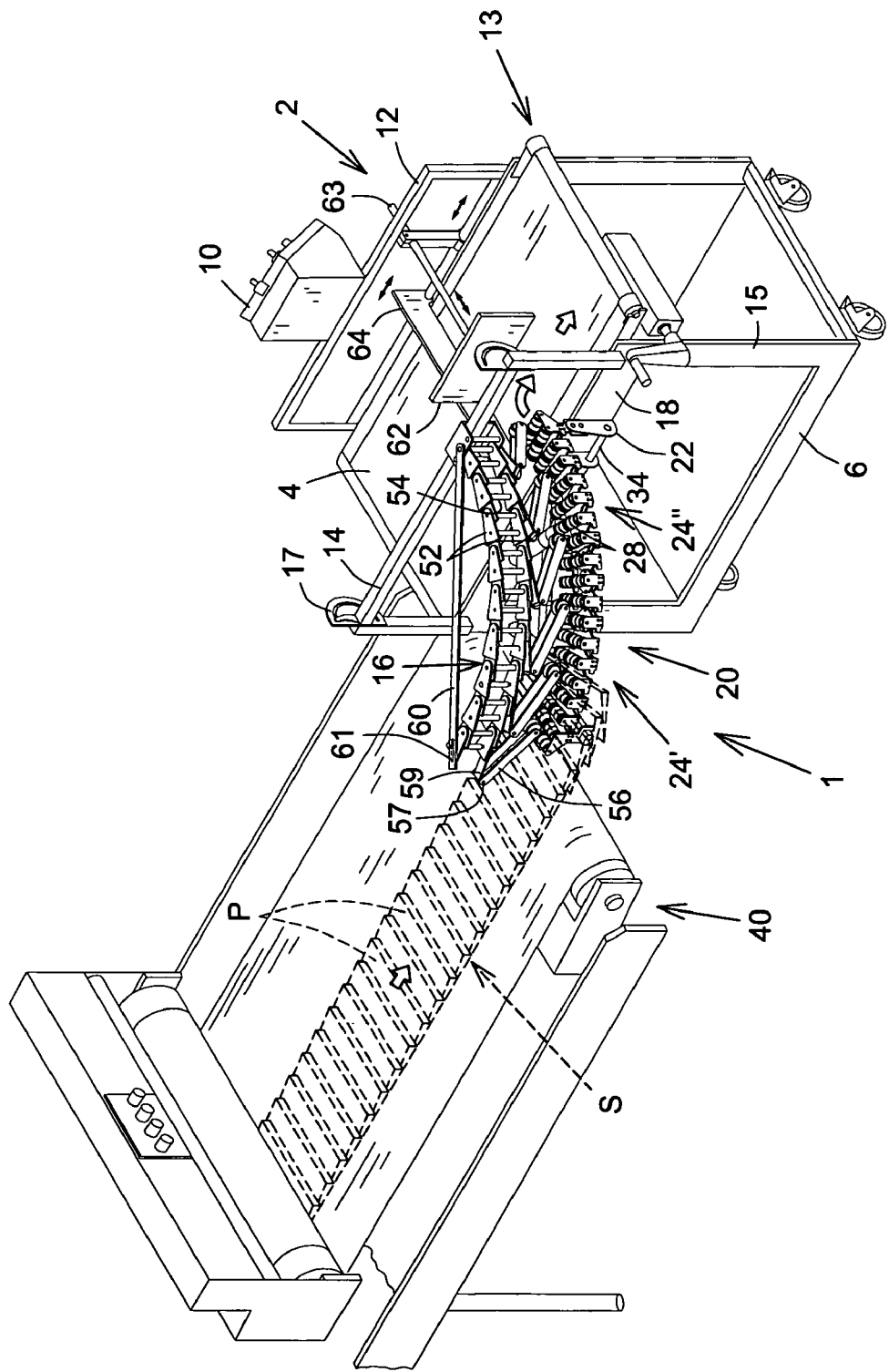
FIG. 1 is a perspective view or a package stream indexer device according to a first embodiment of the present invention mounted in association with a displaceable output conveyor.
Figure 2:
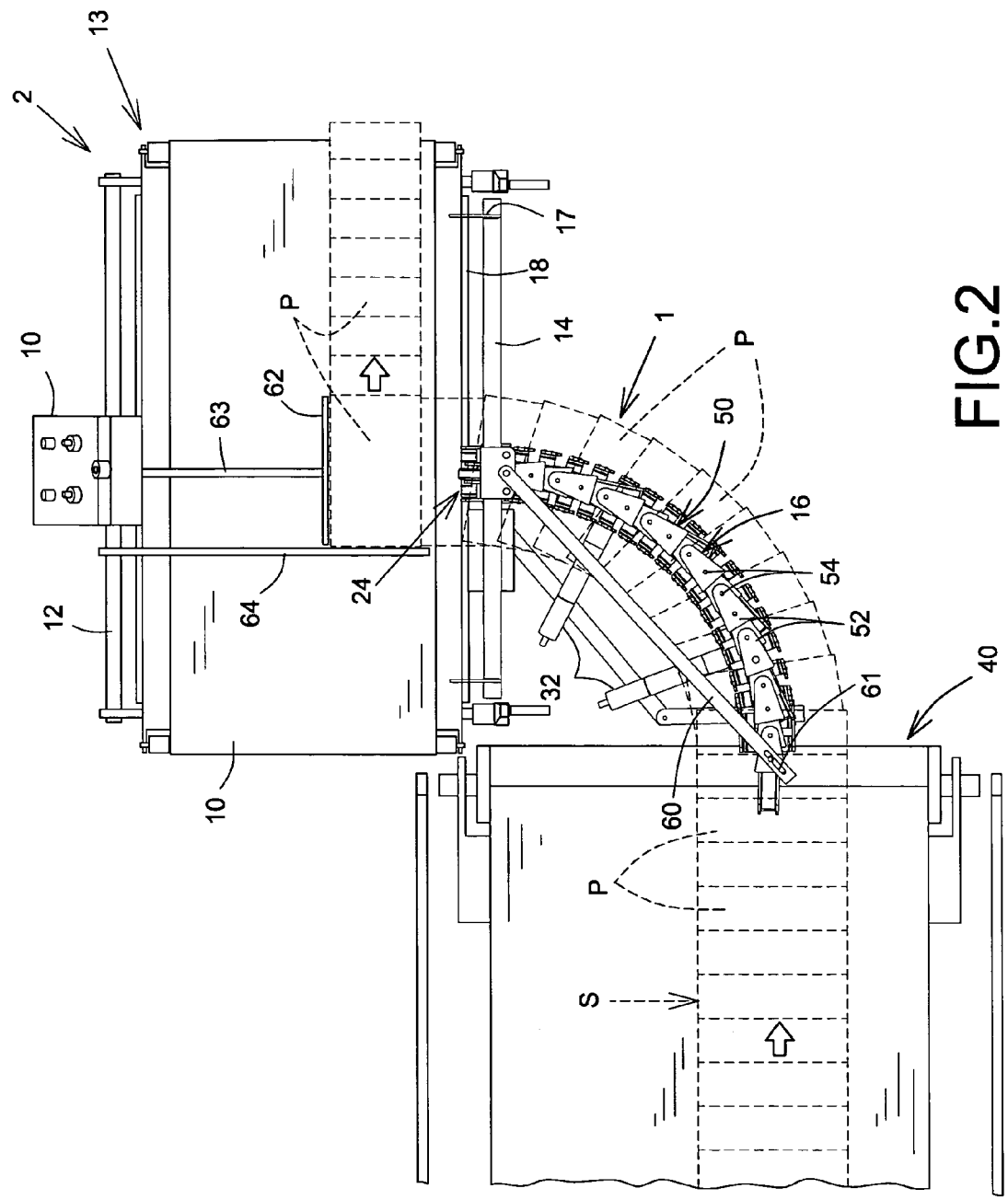
FIG. 2 is a plan view or the device shown in FIG. 1.
Figure 3:
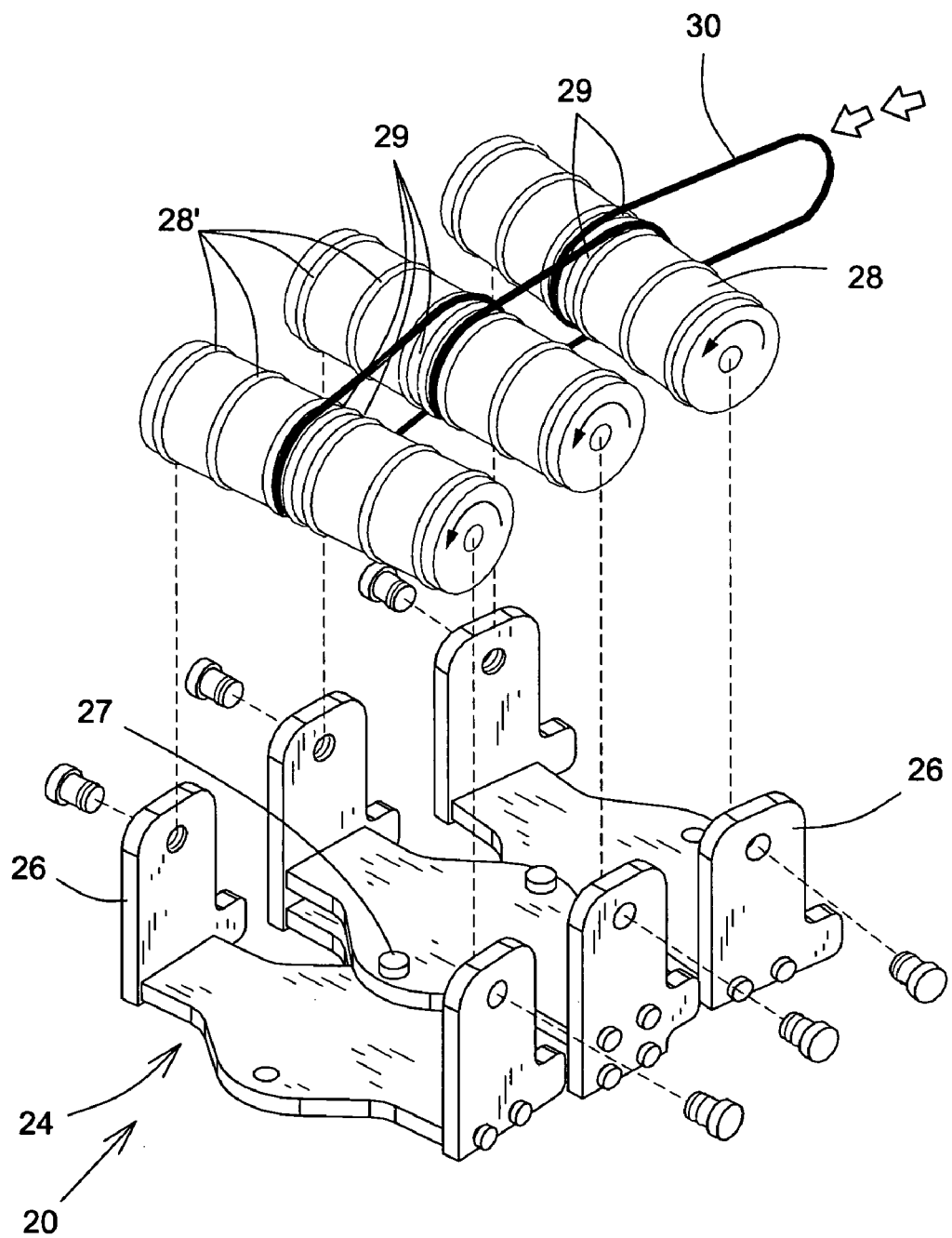
FIG. 3 is a perspective view of a detail partially exploded of the device illustrated in the previous figures.
Figure 4:
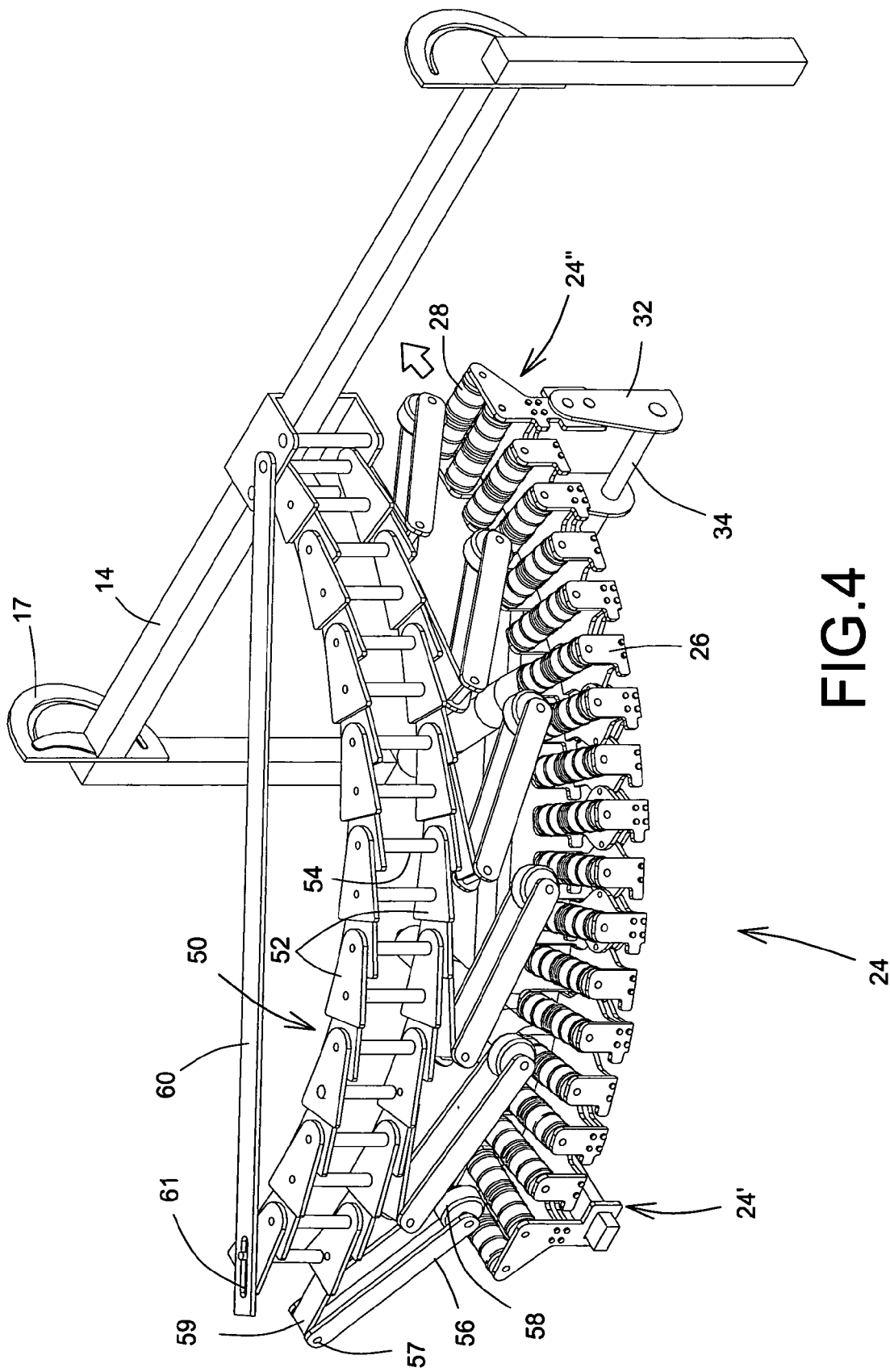
FIG. 4 is a close-up view of the device shown in FIGS. 1 and 2.

Referring to the drawings, there is illustrated generally at 1 a package stream indexer device, for indexing a stream S of packages P partially shown in dotted lines in FIGS. 1 and 2 substantially within a stream plane defined by the incoming stream, mounted on a displaceable output conveyor machine 2 incorporating a belt conveyor 4, the conveyor 4 and the device 1 being supported on and by a mobile base unit 6, which is adjustable in height. A control console 10 is affixed to a front rail 12 provided at the front side 13 of the unit 6 adjacent a front margin of the conveyor 4, which runs longitudinally of the base unit 6.

On the opposite rear side 15 of the unit 6 there is formed thereon a rear support rail 14 incorporating a 90° pivot mounting 17 for a relatively upper part 16 of the device 1. The opposite side of the unit 6 also provides at substantially the level of the conveyor 4 a support beam 18 for a relatively lower part 20 of the device 1, the beam including a 90° pivot mechanism 22 for the lower part 20.

The relatively lower part 20 of the device 1 includes a first articulated track 24 comprising a plurality of links 26 frictionally interconnected one with the other in series by pivot bolts 27 about respective articulation axis generally perpendicular to the stream plane. The links 26, which define an articulation line, allow dynamic movement upon application of pressure and maintain the track 24 in any selected and set position once so placed, although the preferred two positions are the two extreme ones, namely 90 degrees in each direction, provided with abutment stoppers (not shown) to ensure proper orientation of the track 24. Each link 26 provides a cradle for a grooved live roller 28 provided with friction bands 28', typically elastic drive belts 30 being reeved serially over adjacent preceding and succeeding rollers 28 in the grooves 29 provided therefore and located adjacent the articulation line and typically on either side thereof. The rollers 28 are driven by motors 32 located on the track 24 and coupled to rollers 28 at spaced apart locations on the track or other locations. The motors may be of any appropriate type, but may typically be electric.

The first track 24 has a receiving end 24' and a delivery end 24", the receiving end 24' being in use located adjacent the delivery end of an input belt conveyor 40 and the delivery end 24" being disposed adjacent the rear side 15 of the base unit 6 adjacent the rear side of the conveyor 4. The track 24 is hinged at 34 to the rear side 15 of the unit 6 and is shown in FIGS. 1, 2, 4, 5 and 6 in an operational position extending outwardly from the unit 6. It may be moved into a non-operational position adjacent the rear side 15 of the unit 6 by pivoting on the hinge 34. Restitution to the operational position may be achieved by a hydraulic ram 72 (see FIGS. 6 and 6a, but not shown in the other figures).

The relatively upper part 16 of the device 1 comprises a package retainer mechanism, typically in the form of a second articulated track 50 including a series of links 52 frictionally interconnected by pivot pins 54 which allow dynamic movement upon the application of force to pivot about the articulation axes of the pins generally perpendicular to the stream plane but which set the track into the orientation chosen. Depending from the track 50 is a pressure mechanism, typically in the form of a series of arms 56 on the ends of which are rotatably mounted a series of pressure wheels 58, the pressure typically being provided by the respective weight of each wheel, the arms being freely pivoted as at 57 to respective support bars 59 attached directly to and extending from the links 52 of the track 50 as shown. The track 50 is mounted on the support rail 14 which has the pivot mounting 13 at each end of the rail this permitting a 90° rotational movement of the whole track within the stream plane. A support arm 60 extends from the rail 14 and in use supports the track 50 in its set selected position. The support arm 60 is typically provided with a slot hole 61 to allow re-orientation of the upper track 50 without disassembly thereof.

Although not illustrated herein, other types of package retainer mechanism, such as a top plate or pads maintained spaced above the rollers, could be considered without departing from the scope of the present invention.

The displaceable output conveyor machine 2 is supported by the base unit 6 which is provided with a side guide 62 in the form of a plate mounted on a rod 63, the position of the guide 62 being variable across the belt conveyor 4 always in register with the delivery end 24" as shown. The machine 2 further has a directional guide 64 which is associated with the delivery end 24" of the first track 24 and the side guide 62 such that in practice conveyed packages take the appropriate path. The directional guide 64 may be placed on either one side or the other of the side guide 62 so that the indexer feed may be directed in either direction, namely to the right or to the left of the delivery end 24", depending on which side is located the machine 2 relative to the input belt conveyor 40.

Figure 5:
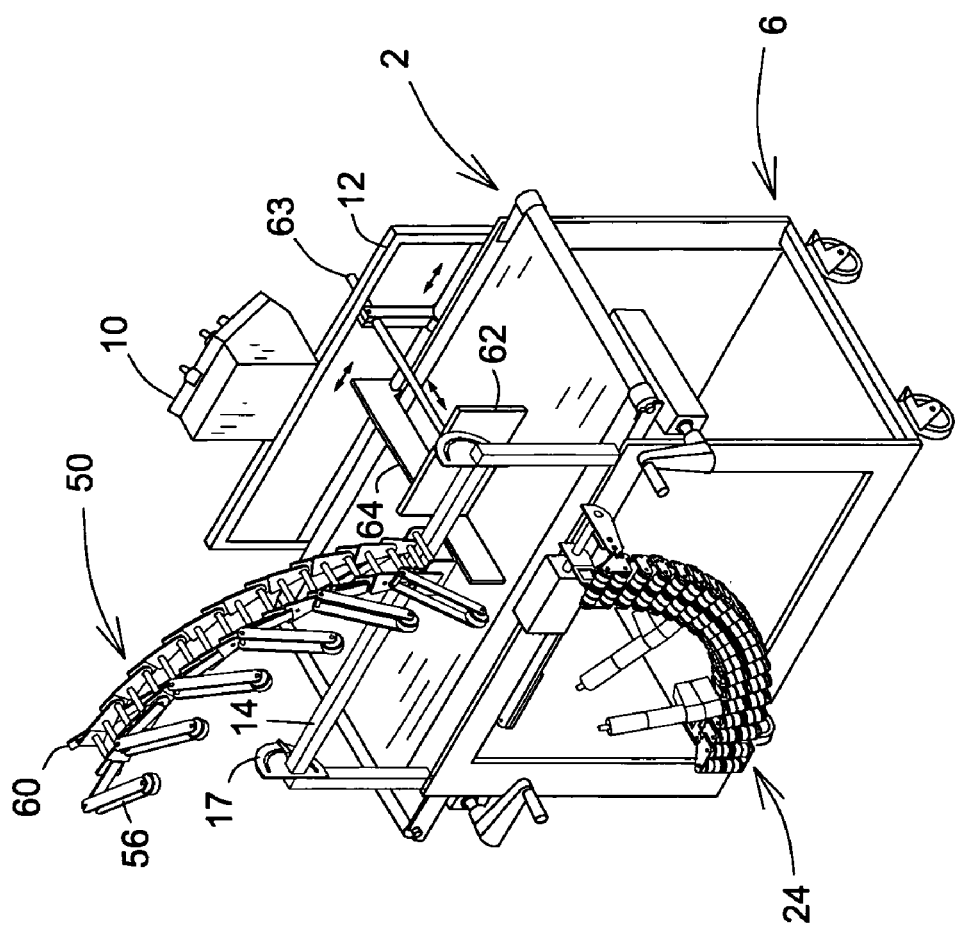
FIG. 5 is a perspective view of the device in parked mode on the conveyor shown in FIGS. 1 and 2.

In operation, the package stream indexer 1 is disposed adjacent the delivery end of the belt conveyor 40. FIG. 5 illustrates the indexer in a non-operational mode with the tracks 24 and 50 vertically parked adjacent the rear side 15 of the base unit 6. In order to bring the indexer into operational mode extending substantially horizontally from the base unit, the first track 24 is moved into position in relation thereto with its receiving end 24' in feed communication with the delivery end of the conveyor 40. The links 26 are moved for this purpose and pivot about the pins 27 to be set by frictional forces in the selected position, typically into either one of the two extremes 90-degree curves. The receiving end 24' is then fixed in that position by means of a bracket (not shown) and is locked at its delivery end 24" at the hinge 34 to prevent any inadvertent movement.

The second track 50 is then oriented into a similar position over the first track 24, the idler wheels 58 moving into a contact mode by the pivoting of the arms 56 about their pivots 57.

The side guide 62 and the guide 64 are then disposed over the conveyor 4 to provide the appropriate feed path for packages discharged from the track 24.

The live rollers 28 are powered up by motors 32 and the conveyor 4 is started and packages P being conveyed by conveyor 40 are delivered to the track 24 where they continue to be conveyed within the stream plane, being held in contact with the track by the pressure wheels 58. Any variation in the dimension of the packages is accommodated by the wheels 58 which are gravity loaded. The packages P are delivered onto the conveyor 4 whence they are transported to the right as illustrated, after being thence rotated 90 degrees relative to each other along the output stream, relative to their relative position in the input stream. Any desired change in the directional stream path induced by the indexer device 1, left (see FIGS. 1 and 2) or right (see FIG. 6), is easily accommodated on the conveyor 4 by altering the positioning of the side guide 62 and the directional guide 64.

If it becomes necessary to change the orientation of the indexer for strategic or practical reasons, the disposition of the tracks 24 and 50 are altered merely by dynamic movement into a fresh set position to secure the desired flow stream.

Figure 6:
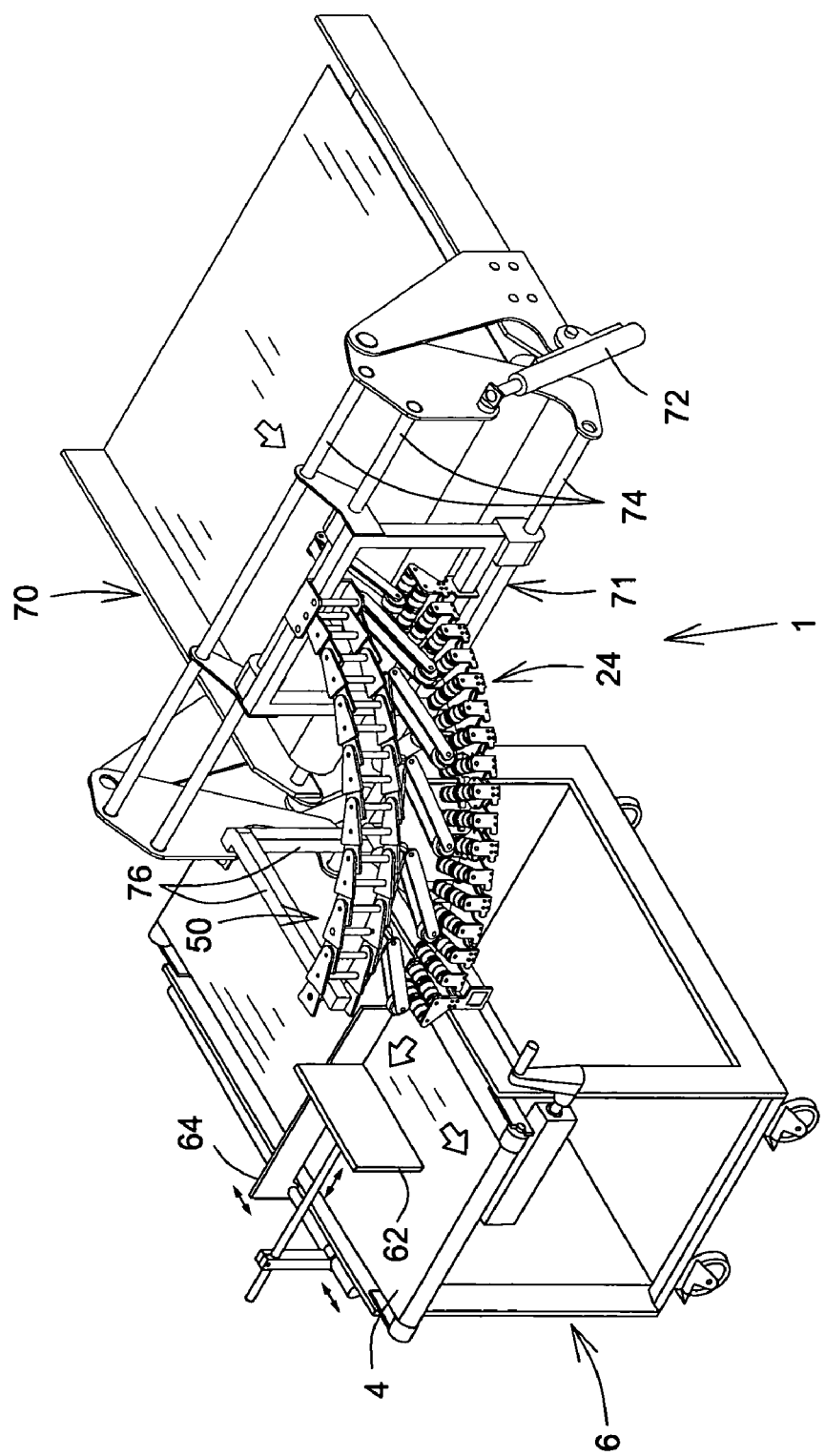
FIG. 6 is a perspective view of a second embodiment of the device shown mounted in an operational mode on an input delivery conveyor.
Figure 6A:
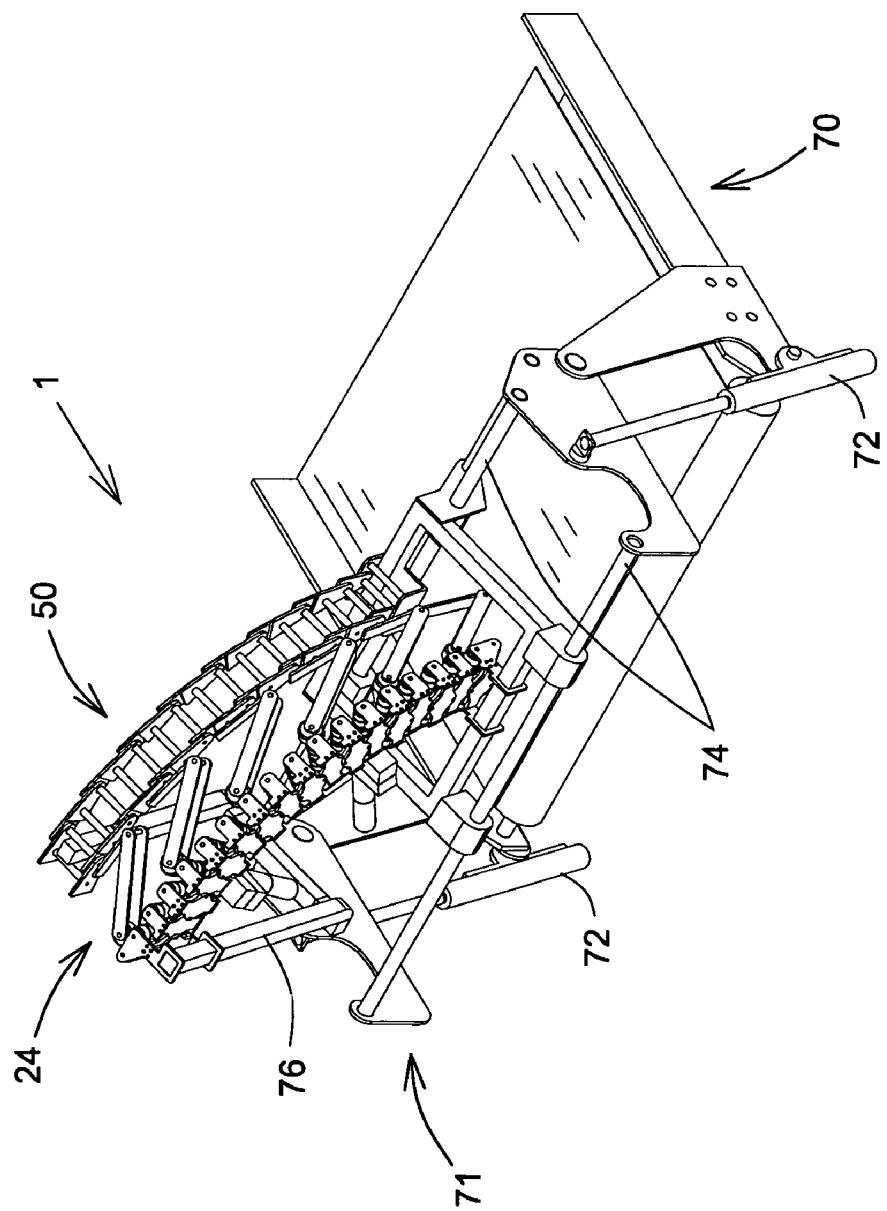
FIG. 6a is a perspective view corresponding to that shown in FIG. 6 with the device in a non-operational mode.

FIG. 6 illustrates the package stream indexer in position adjacent the delivery end conveyor 70 of a folder-gluer machine, with the tracks 24 and 50 being mounted on a support structure 71 fixed to the end of that conveyor. A hydraulic ram 72 is provided to move the tracks to and from the operational position shown in FIG. 6 into a non-operation parked mode illustrated in FIG. 6a, whenever required. The support structure 71 has guide rails 74 on which the tracks 24 and 50 are mounted in sliding manner in order to allow lateral or transversal positional adjustment therealong, typically using a worm screw mechanism or the like (not shown). The free ends of the two tracks 24, 50 are typically releasably secured to the support structure 71 with a C-shape support frame 76.

The versatility of the articulated tracks facilitates machinery set-up in a package stream (shingle) handling plant and enables adjustment of positioning in the absence of complicated and time-consuming movement of plant elements.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A package stream indexer device for indexing a stream of packages being displaced thereon within a stream plane, said device comprising a support section mounted on a mounting frame and including a series of live rollers mounted on an articulated track defining a shaped package path having an articulation line substantially within the stream plane, the track being formed of a plurality of interconnected links frictionally engaged together and adapted for dynamic movement for the purpose of altering the orientation of the shaped package path, each said link of the plurality of links pivotally interconnecting to an adjacent said link about an articulation axis generally perpendicular to the stream plane, and an opposite package retainer mechanism mounted on the mounting frame and being disposed adjacent and in spaced relation to the articulated track in a direction perpendicular to the stream plane for keeping packages in abutment contact with the rollers within the stream plane.

2. A package stream indexer according to claim 1 wherein the package retainer mechanism includes a pressure mechanism to ensure the packages remain in abutment contact with the rollers.

3. A package stream indexer according to claim 2 wherein the articulated track is a first articulated track, and wherein the package retainer mechanism includes a series of pressure wheels mounted on a second articulated track formed similarly to the first articulated track, the second articulated track complementing said first track in defining the shaped package path and also being adapted for dynamic movement for the purpose of assuming the orientation of the package path.

4. A package stream indexer according to claim 3 wherein the first and second articulated tracks are lower and upper tracks, respectively.

5. A package stream indexer according to claim 3 wherein the links of the first and second articulated tracks are interconnected in such manner as to enable the tracks to be dynamically moved to assume and maintain in a set condition an appropriate orientation of the package path in the absence of further activity.

6. A package stream indexer according to claim 3 wherein the live rollers of the first articulated track are driven by drive belts reeved around the rollers.

7. A package stream indexer according to claim 6 wherein the rollers are grooved and the drive belts are reeved around the rollers within grooves.

8. A package stream indexer according to claim 7 wherein each said drive belt is an elastic drive belt.

9. A package stream indexer according to claim 7 wherein the grooves are located adjacent said articulation line.

10. A package stream indexer according to claim 7 wherein each said roller includes a pair of said grooves located adjacent to and on a respective side of said articulation line, each said groove of said pair receiving a respective said drive belt reeved therearound for connection with a respective one of preceding and succeeding adjacent said rollers.

11. A package stream indexer according to claim 3 wherein the live rollers of the first articulated track are provided with friction bands.

12. A package stream indexer according to claim 3 wherein the pressure rollers of the second articulated track are mounted on pivoted arms attached in spaced manner along the length of said second track, the arms being adapted to pivot such as in use to bring the wheels into contact with the packages passing along the first track in order to maintain alignment of the packages thereon.

13. A package stream indexer according to claim 3 wherein the links of both the first and second articulated tracks are constructed and pivotally interconnected about an articulation axis generally perpendicular to the stream plane such as to provide one plane of movement as between each other and in use dynamic displacement of the tracks occasions movement of the links from one set position to another set placement.

14. A package stream indexer according to claim 3 wherein the first and second articulated tracks are hinged to a support structure of the mounting frame.

15. A package stream indexer according to claim 3, further comprising a displaceable output conveyor.

16. A package stream indexer according to claim 15 wherein the displaceable output conveyor is mounted on a mobile base unit.

17. A package stream indexer according to claim 16 wherein the mobile base unit is provided with a control console.

18. A package stream indexer according to claim 16 wherein the first and second articulated tracks are mounted on the base unit.

19. A package stream indexer according to claim 16 wherein the mobile base unit is provided with a side guide and a guide adapted to direct in use packages delivered from the first and second articulated tracks.

20. A package stream indexer according to claim 1 wherein at least one motor is provided to drive at least one live roller.

* * * * *